United States Patent [19]

Bauman et al.

[11] Patent Number: 4,608,396

[45] Date of Patent: Aug. 26, 1986

[54] METHOD OF PRODUCING ELASTOMERIC SILICONE FOAM

[75] Inventors: Therese M. Bauman; Chi-Long Lee; James A. Rabe, all of Midland, Mich.

[73] Assignee: Dow Corning Corporation, Midland, Mich.

[21] Appl. No.: 825,494

[22] Filed: Feb. 3, 1986

Related U.S. Application Data

[62] Division of Ser. No. 787,857, Oct. 16, 1985, Pat. No. 4,593,049.

[51] Int. Cl.$^4$ .............................................. C08J 9/14
[52] U.S. Cl. .................................... 521/99; 521/82; 521/88; 521/91; 521/110; 521/111; 521/117; 521/134; 521/154; 528/15; 528/31; 528/32
[58] Field of Search ............... 528/15, 31, 32; 521/82, 521/88, 99, 117, 91, 110, 111, 134, 154

[56] References Cited

U.S. PATENT DOCUMENTS

| | | | |
|---|---|---|---|
| 3,070,555 | 12/1962 | Bruner | 521/127 |
| 3,425,967 | 2/1969 | Modic | 521/119 |
| 3,428,580 | 2/1969 | Nitzche et al. | 521/124 |
| 3,923,705 | 12/1975 | Smith | 521/154 |
| 4,026,843 | 5/1977 | Kittle | 521/88 |
| 4,026,845 | 5/1977 | Kim et al. | 521/154 |
| 4,189,545 | 2/1980 | Modic | 521/154 |
| 4,418,157 | 11/1983 | Modic | 521/82 |
| 4,518,726 | 5/1985 | Lee et al. | 521/82 |

Primary Examiner—Morton Foelak
Attorney, Agent, or Firm—Edward C. Elliott

[57] ABSTRACT

A method of producing elastomeric silicone foams from a two-part system is disclosed. The method mixes the ingredients then allows a froth to form and cure at ambient temperature to an elastomeric silicone foam. The method mixes a vinyl-containing polydiorganosiloxane (1), a hydroxylated polydiorganosiloxane (2), a platinum catalyst (3), an organohydrogensiloxane (4) and a profoamer (5). The profoamer is a resinous, benzene-soluble organosiloxane copolymer consisting essentially of $SiO_{4/2}$ units, silicone bonded hydroxyl groups, $(CH_3)_3SiO_{1/2}$ units, and fluorine-containing units. An embodiment of the method includes a liquified blowing agent and stores the mixture under superatmospheric pressure, forming a foam by releasing the mixture to atmospheric pressure. Another embodiment includes an alcohol in the mixture to provide a foam of lower density. when lauryl alcohol is used and the alcohol is mixed with (1), (3), and (5) before (2) is admixed, the foam has a Bashore resiliency of less than 20.

13 Claims, No Drawings

METHOD OF PRODUCING ELASTOMERIC SILICONE FOAM

This is a division of application Ser. No. 787,857, filed on 10-16-85, now U.S. Pat. No. 4,593,049.

BACKGROUND OF THE INVENTION

1. Field of Invention

This invention relates to silicon elastomeric foams produced by mixing two parts together, said mixture frothing and curing at room temperature.

2. Background Information

A number of methods have been developed over the years for producing foam based upon elastomeric silicone polymers. A composition was disclosed by Modic in U.S. Pat. No. 3,425,967, issued Feb. 14, 1969, that gave improved strength and flame retardancy in the foamed state by including inorganic fibrous material in a composition which produced a foam because it contained a blowing agent which released an inert gas when the composition was heated. Smith disclosed a method of making elastomeric silicone foam at room temperature in which the foam was formed upon mixing of the ingredients. The foam formed was stated to be fire retardant and non-toxic. His method, disclosed in U.S. Pat. No. 3,923,705, issued Dec. 2, 1975, mixes an organohydrogensiloxane, a hydroxylated organosiloxane, and a platinum catalyst. The reaction simultaneously generates hydrogen to form the foam and crosslinks the polymer to cure the foam. He discusses varying the density of the foam by changing the ratio of silicon-bonded hydrogen to silicon-bonded hydroxyl as well as the filler loading. Such changes would also change the crosslink density of the cured foam.

A composition which formed a foam, upon heating above 125° C., that had a thin skin or no skin was disclosed by Kittle in U.S. Pat. No. 4,026,843, issued May 31, 1977. His composition was based upon a gum base stock to which an organic alcohol having one C-OH per molecule, optionally hydroxylendblocked polydiorganosiloxane fluid, organohydrogensiloxane, acetylenic alcohol inhibitors, and platinum catalyst are added.

A method of decreasing the density of a silicone foam comprising a hydroxylated organosiloxane, an organohydrogensiloxane, and a platinum catalyst was disclosed by Kim et al. in U.S. Pat. No. 4,026,845. They obtain lower density by adding a fluorinated surfactant to the composition. They define such materials to be those compounds known in the art which contain fluorine atoms on carbon and are also surfactants. Examples are perfluorinated polyethers and siloxanes containing organic radicals having fluorine bonded thereto.

Another method of reducing the density of a silicone foam is disclosed by Modic in U.S. Pat. No. 4,418,157, issued Nov. 29, 1983, by adding a resinous copolymer to a foamable silicone composition having a base polydiorganosiloxane, an organohydrogensiloxane, and a platinum catalyst. The resinous copolymer consists of resinous copolymers of $R_3SiO_{1/2}$ units and $SiO_2$ units; and resinous copolymer of $R_3SiO_{1/2}$ units, $R'_2SiO$ units, and $SiO_2$ units.

U.S. Pat. No. 4,518,726, issued May 21, 1985, to Lee and Rabe describes the use of resinous benzene-soluble organosiloxanes having fluorine-containing units as foam stabilizers for use in moisture-curing silicone elastomeric foams which are stored in the absence of moisture in aerosol containers. The foam is formed by releasing the contents to the atmosphere, the foam forming upon release of the pressure and then curing by reacting with the moisture in the air.

The above references disclose methods of making elastomeric silicone foams and means for lowering the density of the foam. The references do not teach how to obtain more uniform foam with finer cells. The references do not teach how to obtain different combinations of foam properties such as density, compressibility and resiliency.

Accordingly, means for controlling foam properties such as compressibility and resiliency as well as density were desirable for use with different foamable silicone compositions. Means for producing silicone foams having a density of less than 160 kg/m³ and a compressibility at 25 percent compression of less than 24 kPa while retaining useful strength were desired.

SUMMARY OF THE INVENTION

This invention relates to a method of producing an elastomeric foam by mixing a vinyl-containing polydiorganosiloxane, a hydroxylated polydiorganosiloxane, a platinum catalyst, an organohydrogensiloxane, and a profoamer consisting of benzene-soluble organosiloxane copolymer consisting essentially of $SiO_{4/2}$ units, silicon-bonded hydroxyl units, $(CH_3)_3SiO_{1/2}$ units, and fluorine-containing units selected from the group consisting of $R_aR'_bSiO_{(4-a-b)/2}$, $R''[Si(R')_bO_{(3-b)/2}]_2$, and mixtures thereof, and optionally a liquified blowing agent, and optionally an alcohol having from 1 to 12 carbon atoms.

It is an object of this invention to produce a silicone closed-cell foam at room temperature having smaller, more uniform cells.

It is an object of this invention to produce a silicone foam at room temperature using an aerosol container to store the composition, the foam being produced at room temperature by releasing the contents to atmospheric pressure and temperature.

It is an object of this invention to produce silicone foam with a Bashore resiliency of less than 10.

It is an object of this invention to produce silicone foam having reduced flammability in conjunction with a density of less than 160 kg/m³ and compressibility at 25 percent compression of less than 24 kPa.

DESCRIPTION OF THE INVENTION

This invention relates to a method of producing a elastomeric silicone foam consisting of (A) mixing ingredients consisting essentially of (1) a vinyl containing polydiorganosiloxane having at least an average of about 2 vinyl radicals per molecule, the organic radicals being selected from the group consisting of alkyl radicals having from 1 to 6 carbon atoms per radical, phenyl, and vinyl (2) a hydroxylated polydiorganosiloxane having an average of from greater than 1 to 2.5 silicon-bonded hydroxyl radicals per molecule and having an average of at least one organic radical per silicon atom selected from the group consisting of alkyl radicals having from 1 to 6 carbon atoms per radical and phenyl, (3) a platinum catalyst in an amount sufficient to give from 5 to 200 parts by weight platinum per one million parts by weight total mixture, (4) an organohydrogensiloxane having an average of at least 3 silicon-bonded hydrogen atoms per molecule, an average of no more than one silicon-bonded hydrogen atom per silicon atom and organic radicals selected from the group consisting of alkyl radicals having from 1 to 6 carbon atoms per radical and phenyl, (5) a profoamer consisting essentially of a resinous, benzene-soluble organosiloxane copolymer consisting essentially of $SiO_{4/2}$ units, silicon-bonded hydroxyl groups, $(CH_3)_3SiO_{1/2}$ units and fluorine-containing units selected from the group consisting of $R_aR'_bSiO_{(4-1-b)/2}$ and $R''[Si(R')_bO_{(3-b)}/2]_2$ and mixtures thereof, where R is a monovalent organic radical containing at least four perfluorinated carbon atoms and is bonded to the silicon atom of said fluorine-containing units by a sequence of at least two methylene units or by an oxygen atom that is, in turn, bonded to a sequence of at least two methylene units. R' is an alkyl radical containing from 1 to 3 carbon atoms, and R'' is a divalent organic radical containing at least four perfluorinated carbon atoms and is bonded to the silicon atom of said fluorine-containing units by means of a carbon or oxygen atom, a is 1 or 2, b is 0, 1 or 2 and the sum of a and b is 3 or less with the provision that when R and R'' represent fluorine-containing units bonded to silicon via an oxygen atom the organosiloxane copolymer optionally contains repeating units of the formula $GSiO_{3/2}$ where G represents the residue obtained by removal of the hydrogen atom from a hydroxyl group of a linear organic polymer containing an average of at least one terminal hydroxyl group per molecule and selected from the group consisting of polyethers, polyoxyalkylene glycols, homopolymers of ethylenically unsaturated alcohols and copolymers of ethylenically unsaturated alcohols with ethylenically unsaturated hydrocarbons; the molar ratio of all units other than hydroxyl and $SiO_{4/2}$ units to $SiO_{4/2}$ units is from 0.7:1 to 1.1:1, inclusive, and the concentration of said fluorine-containing units and any $GSiO_{3/2}$ units is sufficient to (a) impart a surface tension of less than $2.2 \times 10^{-4}$ newtons per centimeter at 25° C. to a 10 percent by weight solution of (5) in a hydroxyl endblocked polydimethylsiloxane exhibiting a viscosity of 0.08 Pa.s at 25° C. and (b) require the addition of from 0 to 100 percent by weight of xylene to said 10 percent by weight solution to achieve optical clarity and optionally, (6) an amount of liquified blowing agent sufficient to form a foam following the release of a mixture containing said liquified blowing agent into an area under atmospheric pressure, the mixture containing this liquified blowing agent being confined under superatomspheric pressure, and optionally (7) an alcohol having from 1 to 12 carbon atoms, there being sufficient organohydrogen present to provide a molar ratio of silicon-bonded hydrogen atoms to the sum of vinyl radicals, silicon-bonded hydroxyl radicals, and carbon-bonded hydroxyl radicals of 0.5 to 40, the mixture having a viscosity of less than 100 Pa's at 25° C., thereafter, (B) allowing the mixture to form a froth and cure at ambient temperature to an elastomeric silicone foam.

The composition is mixed at the time the froth is to be formed, because the ingredients react to form the froth upon mixing. The ingredients are preferably combined into two mixtures for storage purposes with the platinum catalyst in one mixture and the organohydrogensiloxane in the other mixture.

It has been discovered that the addition of particular amounts of a particular class of profoamer to silicone compositions, which contain an organohydrogensiloxane, a platinum-containing catalyst, and hydroxyl-containing siloxane polymer which react to give foams, results in modified foams with smaller, more uniform cells. The cells are primarily closed. The addition of the profoamer allows the production of foams having different combinations of properties, such as density, compressibility, and resiliency, than those found in foams without the profoamer. This unexpected change in property profiles enables a formulator to provide new and different combinations of properties to better adapt different foams to different uses such as seat cushioning and shock absorbing.

The method of this invention combines the ingredients into a uniform mixture and then allows the mixture to form a froth at room temperature and pressure. When mixed together the ingredients react to give off hydrogen gas, which causes the mixture to form a froth. At the same time that the hydrogen gas is given off, the mixture polymerizes and crosslinks to form an elastomeric foam.

One embodiment of the method of this invention adds a liquified blowing agent to the mixture while under super atmospheric pressure. Upon release to atmospheric pressure, the blowing agent aids in forming a froth which cures to a foam.

Another embodiment of the method of this invention adds an alcohol as an ingredient. The combination of profoamer and alcohol produces a foam having a lower density than when the profoamer alone is used. The combination of profoamer and lauryl alcohol produces foam which has an unexpectedly low resiliency. The foam has both open and closed cells, primarily open cells. Such foam is particularly useful for sound and energy absorption.

Another embodiment of the method of this invention produces a foam having superior flame retardancy. Flame retardancy is obtained by adding a mixture of non-flammable fibers and sulfur-free carbon black and dispersing the ingredients uniformly through the mixture before forming the froth.

When the ingredients (2), (3), and (4), are combined, hydrogen gas is given off. Foam can be produced in a continuous manner by use of continuous mixing devices which continuously meter each ingredient into a mixing chamber in the proper ratio, continuously mix, and continuously discharge the mixture into a container or onto a belt where the foam is formed.

The method of this invention can also be practiced by combining the ingredients into two or more parts for storage purposes, then combining the parts at the time the foam is desired. Preferred are two parts in which the vinyl-containing polydiorganosiloxane (1), the platinum catalyst (3), and the profoamer (5) are combined to make one part. The hyroxylated polydiorganosiloxane (2) and the organohydrogensiloxane (4) make up the second part. The two parts can be easily stored because there is little reaction between the ingredients. When the two parts are mixed together, the reaction between the hydroxylated polydiorganosiloxane and the organohydrogensiloxane in the presence of the platinum catalyst gives off hydrogen and the foam is formed.

The ingredients can be combined in any combination to make two parts for storage as long as the hydroxylated or vinyl-containing polydiorganosiloxanes are not present with the organohydrogensiloxane and the platinum catalyst. For best shelf life, it is desirable not to have the platinum catalyst and organohydrogensiloxane in the same package.

It is possible to make foams without the vinyl-containing polydiorganosiloxane, using only the hydroxylated polydiorganosiloxane to both provide the hydrogen gas and the crosslinking to give the elastomer, but it is preferred to have both a hydroxyl on silicon and a vinyl on silicon because the amount of each reactive group can be adjusted to give the amount of hydrogen gas and the amount of crosslinking desired in the final foam. In general, more hydrogen gives a less dense foam while more crosslinking gives a harder, denser foam.

The vinyl-containing polydiorganosiloxane (1) is well-known in the art. Preferred are vinyl endblocked polydiorganosiloxanes of the formula

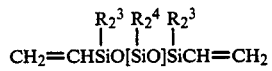

where $R^3$ and $R^4$ are selected from the group consisting of alkyl radicals having from 1 to 6 carbon atoms per radical, phenyl radical, and vinyl radical with at least 50 percent of the $R^4$ radicals being methyl radicals. Preferably, the viscosity is from about 0.4 to 50 Pa's at 25° C.

The hydroxylated polydiorganosiloxane (2) is well-known in the art. The hydroxylated polydiorganosiloxanes can be homopolymers, copolymers, or mixtures thereof. They can be mixtures of different molecular weight species and varying hydroxyl content. As long as some hydroxylated organosiloxane polymer having two or more hydroxylated radicals per molecule is present, hydroxylated silanes can be used to provide from greater than 1.0 to 2.5 silicon-bonded hydroxyl radicals per molecule.

The platinum catalyst (3) can be any of the known forms used for catalyzing the reaction of allyl groups on silicon or hydroxy groups on silicon with hydrogen on silicon. A preferred form of platinum is a chloroplatinic acid catalyst complex as prepared by the method described in U.S. Pat. No. 3,419,593, issued Dec. 31, 1968, which is hereby incorporated by reference, where chloroplatinic acid is mixed with symmetrical divinyltetramethyldisiloxane to provide the complex.

The organohydrogensiloxane (4) can be any siloxane having an average of at least three silicon-bonded hydrogen atoms per molecule and an average of no more than one silicon-bonded hydrogen atom per silicon atom. The remaining valences of the silicon atoms are satisfied by divalent oxygen atoms or by monovalent alkyl radicals having from 1 to 6 carbon atoms per radical, such as methyl, ethyl, propyl, isopropyl, butyl, and hexyl, and phenyl radicals. The organohydrogensiloxanes can be homopolymers, copolymers, and mixtures thereof. Preferably, the organohydrogensiloxane is a copolymer of trimethylsiloxy and methylhydrogensiloxane or a copolymer of trimethylsiloxy, methylhydrogensiloxane and dimethylsiloxane. Preferably, the organohydrogensiloxanes have an average of at least five silicon-bonded hydrogen atoms per molecule.

The profoamers (5) are resinous, benzene-soluble organosiloxane copolymers wherein the repeating units include, but are not limited to, $SiO_{4/2}$ units, $(CH_3)_3SiO_{1/2}$ units and fluorine-containing units comprising at least four perfluorinated carbon atoms and represented by R and R" in the formulae $R_aR'_bSiO_{(4-a-b)/2}$ and $R''[Si(R')_bO_{(3-b)/2}]_2$. Each of the fluorine-containing units also includes one or two silicon atoms that are joined to the fluorine-containing carbon atoms by a sequence of at least two methylene (—$CH_2$—) units or by an oxygen atom that is, in turn, bonded to said sequence. This sequence forms part of the group represented by R in the foregoing formulae.

The fluorine-containing units of (5) can be identical or different. These units exhibit the general average formula $R_aR'_bSiO_{(4-a-b)/2}$ or $R''[Si(R')_bO_{(3-b)/2}]_2$. In these formulae R and R" represent, respectively, monovalent and divalent fluorinated organic radicals as described hereinbefore, R' is alkyl containing from 1 to 3 carbon atoms, a is 1 or 2, b is 0, 1 or 2 and the sum of a and b is 3 or less.

In addition to at least four perfluorinated carbon atoms, R and R" can include partially fluorinated and/or non-fluorinated carbon atoms. The carbon atoms of R and R" can be present in the form of linear chains, branched chains or carboxylic rings. The fluorinated carbon atoms comprising R and R" can be adjacent or separated by nonfluorinated carbon atoms, by atoms such as nitrogen, oxygen or sulfur or by divalent groups such as carbonyl, amido, carboalkoxy, and other groups which do not hydrolyze readily, will not cause premature curing of the present foamable compositions during storage and will not substantially inhibit curing of the compositions in the presence of atmospheric moisture. R and R" can contain from 4 to 20 or more carbon atoms, but preferably contain from 4 to 16 carbon atoms.

The relative concentrations of $(CH_3)_3SiO_{1/2}$, fluorinated siloxane units and any additional units other than $SiO_{4/2}$ units and hydroxyl groups must be within certain limits for (5) to function effectively. These limits are most conveniently expressed in terms of their effect on the surface tension of a hydroxyl terminated polydimethylsiloxane and on the solubility of (5) in this medium.

Specifically, a 10% by weight solution of (B) in a hydroxyl-terminated polydimethylsiloxane exhibiting a viscosity of 0.08 Pa.s at 25° C. should exhibit a surface tension of less than $2.2 \times 10^{-4}$ newtons per centimeter at 25° C. Furthermore, at this same concentration level and temperature the solution must be either optically clear or become optically clear following the addition of not more than 100%, based on the weight of said solution, of xylene.

While not wishing to be bound by any theory, it appears that effective foam stabilizers decrease the surface tension of a foamable composition and exhibit only limited solubility in the composition. The low degree of solubility ensures that at least a portion of the stabilizer will be present at liquid-gas interfaces of the cellular structure of the froth formed by the formation of hydrogen gas, thereby reducing the surface tension at the liquid-gas interfaces and increasing the stability of the froth during the curing reaction. The relatively high viscosity of the present profoamers is believed to impart additional stability to the froth during curing by increasing the elasticity of the cell walls and also reducing the rate at which liquid drains from the cellular structure.

The molar ratio of units other than silicon-bonded hydroxyl groups in (5) and $SiO_{4/2}$ units to $SiO_{4/2}$ units is from 0.7:1 to 1.1:1, inclusive. To maximize the efficacy of (5) as a foam stabilizer for the preferred foamable compositions disclosed in the accompanying examples, this ratio is preferably from 0.7:1 to 0.9:1, inclusive.

In addition to the silicon-containing units disclosed hereinbefore, (5) typically contains from 0.2 up to about 4% by weight of silicon-bonded hydroxyl groups. (5) can also contain up to about 10 weight % of $GSiO_{3/2}$ units, where G represents the residue obtained by removing the hydrogen atom from a hydroxyl group of a hydroxyl containing linear organic polymer. Useful organic polymers include homopolymers of ethylenically unsaturated alcohols such as allyl and cinnamyl alcohol, copolymers of these alchols with ethylenically unsaturated hydrocarbons such as styrene, and polyethers or polyoxyalkylene glycols containing an average of at least one terminal hydroxyl group per molecule. Preferred polymers include styrene/allyl alcohol copolymers and polyoxyalkylene glycols such as polyoxyethylene glycol.

While not a required part of (5), the presence of $GSiO_{3/2}$ units is desirable because they permit (5) to function as an effective stabilizer with less fluorine than would be required if the $GSiO_{3/2}$ units were absent. Because in many instances hydroxyl-containing organic polymers corresponding to the formula GH are considerably less expensive than the fluorine-containing intermediates used to prepare (5), it is usually preferable to employ these organic polymers in place of the additional fluorine-containing intermediate needed to decrease the solubility of (5) in the mixture of (A).

Resinous copolymers wherein fluorine-containing hydrocarbon radicals are bonded to silicon through at least two methylene units can be prepared by reacting trimethylchlorosilane in combination with (1) a fluorine-containing silane of the formula $R_aR'_bSiCl$ where the sum of a and b is 3, (2) a silane of the formula $R''[Si(R)_2Cl]_2$, or (3) suitable derivatives of either (1) or (2) wherein the chlorine atoms are replaced by other hydrolyzable groups. The resultant fluorinated silane is reacted with an aqueous solution of sodium silicate as described by Daudt et al. in U.S. Pat. No. 2,676,182, which issued on Apr. 20, 1954. The disclosure of this patent is incorporated herein in its entirety by reference. The reaction of fluorine-containing silanes with sodium silicate is disclosed in U.S. Pat. No. 3,328,349, which issued on June 27, 1967 to Lentz and is incorporated herein in its entirety by reference. In accordance with a combination of Lentz's and Daudt et al.'s teaching, an aqueous solution of sodium silicate (e.g. No. 9 sodium silicate sold by E. I. Dupont DeNemours and Co.) is acidified to the proper pH by adding it to a mixture of hydrochloric acid and isopropanol. The resulting acidic silica hydrosol can then be treated with a source of $R_aR'_bSiO_{(4-a-b)/2}$ siloxane units, such as $(R)(CH)_3)_2SiOCH_3$ or $(R)(CH_3)_2SiCl$, and a source of $(CH_3)_3SiO_{1/2}$ units, such as $(CH_3)_3SiCl$. These reactants are preferably first dissolved in a mixture of isopropanol and xylene. If chlorosilanes are used, acidification of the sodium silicate may not be required.

After being heated for the time interval required to substantially complete the reaction, the resultant mixture is cooled, whereupon it separates into an aqueous phase, which is discarded, and a nonaqueous phase containing the resinous copolymer. The nonaqueous phase is washed with water to reduce its acid number and remove water-soluble components, such as isopropyl alcohol. Preferably the resinous copolymers prepared by this method are washed with water to remove most, but not all of the acid. The products typically have sufficient acid to provide an acid number of from 0.2 to 2.0.

The fluorinated silanes and siloxanes that can be used to prepare (5) are either known or can be synthesized using known methods. The synthesis of preferred silanes is described in the accompanying examples.

If organic solvents are used to prepare the foam stabilizer (5), these are preferably replaced with a trimethylsiloxy endblocked polydimethylsiloxane exhibiting a viscosity of from about 0.001 to about 1 Pa.s at 25° C.

If it is desired to incorporate repeating units of the foregoing $GSiO_{3/2}$ type into the copolymer, this can be accomplished by including the corresponding hydroxyl-containing polymer GH in the reaction mixture together with the fluorinated reactant. Suitable polymers have been discussed hereinbefore.

A second method for preparing foam stabilizers containing either SiO or SiC bonds comprises reacting nonfluorinated resinous copolymers of the type described in the aforementioned Daudt et al. patent with a fluorinated material. Suitable copolymers contain $(CH_3)_3SiO_{1/2}$ and $SiO_{4/2}$ units in addition to from 0.5 to 4.0% by weight of silicon-bonded hydroxyl groups. The copolymers are reacted with at least one fluorine-containing silane of the formula $R_aR'_bSiY_{(4-a-b)}$ or $YSi(R')_2R''(R')_2SiY$, a partial hydrolysis product of either of the foregoing silanes or at least one fluorine-containing alcohol of the formula $F(C_nF_{2n})(CH_2)_2OH$ where R, R', R'', a and b are defined hereinbefore, Y is a halogen, preferably chlorine or other hydrolyzable group and the average value of n is from 4 to 20.

In preferred embodiments of (5), R of the foregoing formula represents $F(C_nF_{2n})(CH_2)_2O_c$, R' is methyl, R'' represents $—O_c(CH_2)_2(C_nF_{2n})(CH_2)_2O_c—$, c is 0 or 1, and the average value of n is at least 4. Most preferably R represents a mixture of homologous units wherein n is an even integer from 4 to 14 inclusive.

The silanes employed to prepare preferred embodiments of (5) wherein c of the foregoing formulae is 0 exhibit the formulae $F(C_nF_{2n})CH_2CH_2Si(CH_3)_dY_{3-d}$ or $Y_{3-d}(CH_3)_dSiCH_2CH_2(C_nF_{2n})CH_2CH_2Si(CH_3)_dY_{3-d}$ where d is 0, 1 or 2 and n is as defined hereinbefore. These silanes can be prepared by hydrosilation of a fluorinated olefin of the formula $F(C_nF_{2n})CH=CH_2$ or $CH_2=CH(C_nF_{2n})CH=CH_2$ with a silane of the formula $(CH_3)_dY_{3-d}SiH$. The fluorinated olefin can be a single compound or a mixture of homologs wherein n is an even integer having a value of from 4 to 14, inclusive. The hydrosilation reaction is typically carried out at temperatures of from 150° to 300° C. using as the catalyst an organic peroxide or a platinum-containing material such as chloroplatinic acid. The hydrosilation of fluorinated olefins is disclosed, for example, in U.S. Pat. No. 3,620,992, which issued to Kim and Pierce on Nov. 16, 1971 and is incorporated herein in its entirety by reference.

The preferred foam stabilizers wherein c is 1 and a method for preparing these stabilizers are claimed in an application for Letters Patent entitled "Polyorganosiloxane Compositions", Ser. No. 664,898, filed Oct. 26, 1984, by Joseph Woodward Keil, which is herein incorporated by reference to show such stabilizers and their method of manufacture.

Preferred foam stabilizers of the foregoing formula where c is 0 are claimed in an application for Letters Patent entitled "Novel Fluorinated Organosiloxane Copolymers", Ser. No. 664,897, filed Oct. 26, 1984, by Chi-Long Lee, Thomas Fay-Oy Lim and Anthony Pope Wright which is herein incorporated by reference to show such stabilizers. A method for preparing these stabilizers is claimed in an application for Letters Patent entitled "Method for Preparing Novel Fluorinated Organosiloxane Copolymers", Ser. No. 664,917, filed Oct. 26, 1984, by Thomas Fay-Oy Lim and Antony Pope Wright which is herein incorporated by reference to show such method.

An embodiment of the method of this invention produces a foam through the use of an aerosol process wherein the mixture of (A) is prepared in at least two parts as discussed above for storage purposes. In this embodiment, each part is placed in an aerosol container and then an amount of liquified blowing agent (6), sufficient to form a foam following the release of the mixture containing said blowing agent into an area under atmospheric pressure, is added. The mixture with the liquified blowing agent is held under superatmospheric pressure so that the blowing agent remains liquified during the storage period.

To form a foam, each aerosol container is connected to a mixing device, preferably a static mixer, which mixes the contents of each container as they are discharged to produce the mixture (A). When the mixture is then discharged to atmosphere pressure, the blowing agent evaporates and forms a froth. The profoamer present in the mixture functions to stabilize the froth and prevent drainage during the curing of the froth into a foam. The combined mixture reacts to form hydrogen gas which aids in the froth formation and to form the crosslinked elastomeric polymer from the reactive fluids present in the mixture in the manner discussed above. This embodiment provides a convenient means for storing and forming a foam by using the pressure of the blowing agent to dispense and mix the ingredients.

The liquified blowing agent (6), can be any of the well-known aerosol propellants of the hydrocarbon or fluorocarbon types which do not adversely react with the rest of the mixture. The blowing agent is a substance that is soluble or dispersible in the mixture while in the closed container and which is a gas upon release from the closed container into the atmosphere. Superatmospheric pressure is defined as pressure above atmospheric pressure sufficient to contain the composition. Aerosol propellants are well-known in the art. They can be a material such as isobutane, propane, dichlorodifluoromethane, and trichlorofluoromethane, which are liquids while in a closed container under pressure, then expand into a gas when released into the atmosphere. Mixtures of blowing agents can be used in the composition to obtain the desired amount of frothing when the mixture is released to the atmosphere. A preferred propellant is from 1 to 30 parts by weight of propellant added to 100 parts by weight of mixture.

The method of this invention, particularly when using liquified blowing agent to aid in the foam production as discussed above, requires a careful balancing of the various reactions taking place. The mixture is a fluid while in the container. As soon as the ingredients are mixed, reactions start taking place. Reaction between vinyl on silicon radicals and hydrogen on silicon in the presence of the platinum catalyst produces an ≡Si—C—C—Si≡ bond which can give chain extension of the polymer or crosslinking, or both, depending upon the functionality of the molecules involved. A similar reaction takes place between hydroxyl radicals on silicon and hydrogen atoms on silicon to yield both hydrogen gas and an ≡Si—O—Si≡ bond. These reactions must take place rapidly enough to change the fluid ingredients into an elastomer while the froth is in an expanded and stable form so that an elastomeric foam is the result. The profoamer aids in producing a stable froth. If the froth is not stable or the ingredients do not react at the proper rate, the froth will collapse, or excessive fluid will drain out of the froth during the curing process. Adding profoamer prevents collapse of the froth.

One embodiment of the method of this invention adds an alcohol (7) having from 1 to 12 carbon atoms to the composition used. The alcohol can react with the hydrogen atoms on silicon in the presence of the platinum catalyst to generate additional hydrogen gas. When a monohydroxyl alcohol is used, there is no corresponding crosslink formed, so the resulting foam tends to have fewer crosslinks than if the alcohol was not present. Foams containing alcohol tend to have lower density than when it is not present.

A unique embodiment of the method of this invention uses lauryl alcohol as ingredient (7) of the mixture of (A). It has been discovered that the combination of both the profoamer (5) and lauryl alcohol as the alcohol of (7) in the mixture of (A) yields a foam which has an unusually low Bashore resiliency. The unusually low Bashore resiliency is due to the lauryl alcohol as shown in Example 6. The preferred amount of lauryl alcohol is from 1.5 to 5 percent by weight of the mixture.

Foams produced by the method of this invention can be improved in flame retardancy by adding flame retardant additives (8) consisting essentially of non-flammable fibers and sulfur-free carbon black. Preferably, there is present from 2 to 10 percent by weight of flame retardant additives, preferably from 1 to 5 percent by weight of the non-flammable fibers and 1 to 5 percent by weight of sulfur-free carbon black. The non-flammable fibers are thought to aid in retaining the char formed when the foam is subjected to flame, to protect the foam under the charred surface. The non-flammable fibers can be selected from such fibers as carbon fibers, ceramic fibers, and aramide fibers, with ceramic fibers being preferred. The fibers should be fine fibers with average diameters of less than 5 micrometers and lengths of less than 100 millimeters so that the fibers can be evenly and easily distributed throughout the mixture.

The carbon black added can be any of the usual sulfur-free carbon blacks used as additives in silicone elastomers cured with a platinum catalyst. The carbon black is sulfur-free because sulfur interferes with the cure.

Additional ingredients can be added to the mixture of (A) to further modify the foam produced. A platinum catalyst inhibitor, such as methylvinylcyclosiloxane, can be used to slow the reaction rate so that mixing can be completed before the mixture starts to form a froth. Fillers can also be added to the mixtures such as fume silica, diatomacious earth, crushed quartz, zinc oxide, calcium carbonate, fibrous potassium titanate, or other well-known fillers for silicone elastomers. The maximum amount of filler used will depend upon the viscosity of the mixture of (A).

When the method of this invention uses the vinyl containing polydiorganosiloxane (1) hydroxylated polydiorganosiloxane (2), platinum catalyst (3), organohydrogensiloxane (4), and profoamer (5), the resulting foams are primarily closed cell. When the embodiment used makes use of the liquified blowing agent (6), the foams contain both open and closed cells. When the embodiment used makes use of the alcohol (7), the foams contain both open end and closed cells, the lower the density, the larger proportion of open cells.

Resinous copolymers such as described in U.S. Pat. No. 4,418,157, issued Nov. 27, 1983, herein incorporated by reference, can be added to modify the foam properties obtained by the method of this invention. In this invention, such as resinous copolymer increased the density and compressibility of the resulting foam.

The foams of this invention can be used for cushioning, insulation, sealing, sound absorbing, and the like. They can be made fire retardant so that they are useful in sealing walls and such to retard the spread of fire. When made into seating cushions, they can be made self-extinguishing. They are minor contributors of toxic gases when exposed to flame.

The following examples are presented for illustrative purposes and should not be construed as limiting the present invention which is properly delineated in the claims. In the examples, all parts are parts by weight.

EXAMPLE 1

A first composition was prepared by mixing together 46.5 parts of a dimethylvinylsiloxy endblocked polydimethylsiloxane having a viscosity of about 30 Pa's at 25° C. and a vinyl content of about 0.08 percent by weight, 16 parts of benzene soluble resin copolymer of triorganosiloxy units and $SiO_2$ units in the mole ratio of about 0.7 mole of triorganosiloxy unit per mole of $SiO_2$ units where the triorganosiloxy units were trimethylsiloxy units and dimethylvinyl units so that the resin copolymer had about 1.8 weight percent vinyl radicals, 37.5 parts of ground quartz having an average particle diameter of about 5 micrometers and 0.13 part of a platinum catalyst comprising a chloroplatinic acid complex of divinyltetramethyldisiloxane and polydimethylsiloxane fluid to provide 0.7 weight percent platinum in the catalyst. This composition had a viscosity of less than 175 Pa's at 25° C. The total vinyl content was about 0.08 percent by weight.

A second composition was prepared by mixing together 4 parts of a hydroxyl endblocked polydimethylsiloxane having a viscosity of about 0.04 Pa's at 25° C. and a hydroxyl content of about 3.25 weight percent with 1 part of a trimethylsiloxy endblocked polymethylhydrogensiloxane having a silicon-bonded hydrogen atom content of about 1.6 weight percent.

A comparative example was prepared by mixing 100 g of the first composition and 18 g of the second composition together for from 30 to 60 seconds until uniformly mixed and then allowing the mixture to froth and cure to a foam at room temperature. Samples were removed from the cured, closed-cell foam and physical properties were measured. The compressibility is the load required to compress a sample 25 percent of its thickness. A 37.5 mm by 7.5 mm by 2.5 to 5 mm sample was cut from each sample and placed in a Bashore type resiliometer and tested based upon the procedure of ASTM D 2632. The sample was placed in the resiliometer so that the upper surface when tested was the lower surface which was against the container when the foam was formed. The results are shown in Table I.

A foam falling under the claims of this invention was prepared by first mixing 100 g of the above first composition with 10 g of profoamer to form an improved first composition. The profoamer was prepared by reacting 3,584 g of a solid, benzene soluble resin copolymer consisting essentially of trimethylsiloxy units and $SiO_{4/2}$ units with a ratio of about 0.77 trimethylsiloxy unit to each $SiO_{4/2}$ unit and a hydroxyl content of about 2.8 percent by weight as a 75 percent by weight solution in xylene, 3,595 g of $F(CF_2)_nCH_2CH_2Si(CH_3)Cl_2$, where n varied from 6 to 8 with a calculated molecular weight of 442, and 1920 g of toluene, using 1.28 g of trifluoromethane sulfonic acid as the catalyst. The resin copolymer solution and the fluorinated silane were placed in a round bottomed flask fitted with stirrer, condenser, and nitrogen purge. First ½ of the toluene was added and stirring began. The rest of the toluene was added, then the catalyst. The flask was heated and when the contents reached 60° C., the temperature was stabilized. The reaction was continued at 60° C. for 1 hour, then the mixture was neutralized by slowly adding 120 g of sodium bicarbonate. When the mixture was neutral, 3024 g of a trimethylsiloxy endblocked polydimethylsiloxane fluid having a viscosity of about 0.02 Pa's at 25° C. was added. The mixture was cooled to room temperature and filtered to remove the sodium salt. The filtrate was then stripped, starting at 80° C. under vacuum, to remove the volatile materials present. Stripping continued until the temperature reached about 110° C. and the pressure was about 130 Pa. The product had a viscosity of about 4.8 Pa's at 25° C. and a weight average molecular weight of about 8500.

The $F(CF_2)_nCH_2CH_2Si(CH_3)Cl_2$ was prepared by first distilling a sample of $F(CF_2)_nCH=CH_2$ received from E. I. DuPont deNemours and Co. under reduced pressure to yield a mixture of homologs where n had a value of 6, 8, 10, or 12. The average molecular weight of the distillate was 422 g/mol. The distilled olefin was then combined with 8 percent by weight of zinc dust and heated at about 80° C. for one hour, at which time the liquid portion was distilled under reduced pressure. The fraction boiling from 54° C. at 8.4 kPa to 120° C. at 4.7 kPa was collected and analyzed by vaporphase chromotography. The fraction was found to contain 34 percent by weight of $F(CF_2)_6CH=CH_2$, 37 percent by weight $F(CF_2)_8CH=CH_2$, 22 percent by weight $F(CF_2)_{10}CH=CH_2$, and 4 percent by weight of $F(CF_2)_{12}CH=CH_2$. The calculated average molecular weight was 442.

Three 64.5 g portions of this fraction were each reacted in sealed tubes with 23 g of methyl dichlorosilane in the presence of 200 microliters of a chloroplatinic acid in isopropanol solution. The sealed tubes were heated for 5 hours at 115° C. The resultant products were combined and distilled under reduced pressure. The fraction boiling from 71° C. at a pressure of 2.9 kPa to 150° C. at a pressure of 0.133 kPa was collected and analyzed. The fraction amounted to 86 percent yield, based upon reactants, and exhibited an average molecular weight of 544 g/mol. The fraction was found to contain 38% of the $F(CF_2)_nCH_2CH_2Si(CH_3)Cl_2$ homolog where n=6, 35 percent of the n=8 homolog, 19% of the n=10 homolog, and 4 percent of the n=12 homolog.

Foam was prepared by mixing 110 g of the improved first composition and 18 g of the second composition prepared above together for 30 to 60 seconds until uniform and the allowing the mixture to froth and cure to a foam at room temperature. The mixture had about 1.87 mol of silicon-bonded hydrogen atoms per mole of vinyl plus silicon-bonded hydroxyl radicals. Before forming a froth, the mixture had a viscosity of about 50 Pa's at 25° C. Samples of the improved closed-cell foam were removed and tested as above with the results shown in Table I.

TABLE I

|  | Comparative Foam | Improved Foam |
| --- | --- | --- |
| Cell Size Range, mm | 0.2–2.5 | 0.1–1.0 |
| Average Cell Size, mm | 0.4 | 0.2 |
| Number of cells | 22 | 35 |

TABLE I-continued

|  | Comparative Foam | Improved Foam |
| --- | --- | --- |
| per 10 mm |  |  |
| Density, kg/m³ | 416 | 400 |
| Compressibility, kPa | 72 | 41 |
| Bashore Resiliency | 54 | 56 |

The composition produced with the profoamer had smaller, more uniform cells. The foam was softer, i.e., easier to compress while retaining the same resiliency as measured by the Bashore.

EXAMPLE 2

A different first composition was prepared by mixing together 62.4 parts of the dimethylvinylsiloxy endblocked polydimethylsiloxane of Example 1, 37.5 parts of the ground quartz of Example 1, and 0.13 part of the platinum catalyst. This composition is similar to the first composition of Example 1, but the benzene soluble resin copolymer is replaced by additional polydimethylsiloxane.

A comparative example was prepared by mixing 100 g of the first composition above and 18 g of the second composition of Example 1 together for 30 to 60 seconds until uniform and then allowing the mixture to froth and cure to a foam at room temperature. The foam was sampled and evaluated as in Example 1 with the results shown in Table II.

A foam falling under the claims of this invention was prepared by first mixing 100 g of the first composition above with 15 g of the profoamer of Example 1. Foam was prepared by mixing 115 g of this improved first composition and 18 g of the second composition of Example 1 together for 30 to 60 seconds until uniform and then allowing the mixture to froth and cure at room temperature. The viscosity after mixing was less than 100 Pa's at 25° C. Samples were removed and tested as above with the results shown in Table II.

TABLE II

|  | Comparative Foam | Improved Foam |
| --- | --- | --- |
| Cell Size Range, mm | 0.1–3.0 | 0.1–1.0 |
| Average Cell Size, mm | 0.4 | 0.2 |
| Number of cells per 10 mm | 21 | 30 |
| Density, kg/m³ | 304 | 288 |
| Compressibility, kPa | 14–17 | 3.4 |
| Bashore Resiliency | 55 | 38 |

The composition produced with the profoamer had smaller, more uniform cells. The foam compressed under a much smaller load.

EXAMPLE 3

A first composition was prepared by mixing 33.6 parts of a dimethylvinylsiloxy endblocked polydimethylsiloxane having a viscosity of about 0.4 Pa's at 25° C., 43.8 parts of a hydroxyl endblocked polydimethylsiloxane having a viscosity of about 13.5 Pa's and a hydroxyl content of about 0.08%, 16.8 parts of the ground quartz of Example 1, 5.7 parts of pigment, and 0.5 part of the platinum catalyst of Example 1.

A second composition was prepared by mixing 60.7 parts of the above hydroxyl endblocked polydimethylsiloxane, 16.7 parts of the above ground quartz, 11.6 parts of the hydroxyl endblocked polydimethylsiloxane of Example 1, 8.8 part of the polymethylhydrogensiloxane of Example 1 and 2.2 part of a trimethylsiloxy endblocked polyorganosiloxane having an average of five methylhydrogensiloxane units and three dimethylsiloxane units with a silicon-bonded hydrogen atom content of about 0.75 weight percent.

A comparative example was prepared by mixing 20 g of the first composition and 20 g of the second composition together for from 30 to 60 seconds until uniform then allowing a froth to form and cure to closed-cell foam. Samples were removed from the foam and tested as in Example 1 with the results shown in Table III.

A foam falling under the claims of this invention was prepared by first mixing 20 g of the above first composition with 4 g of the profoamer of Example 1. This improved first composition was then mixed with 20 g of the above second composition for 30 to 60 seconds until uniform then allowed to form a froth and cure to a closed cell foam at room temperature. The mixture had a viscosity of about 5.5 Pa's at 25° C. This mixture had a ratio of hydrogen atoms bonded to silicon to the sum of vinyl radicals and silicon-bonded hydroxyl radicals of about 5.6 to 1. Samples were removed and tested with the results shown in Table III.

TABLE III

|  | Comparative Foam | Improved Foam |
| --- | --- | --- |
| Cell Size Range, mm | 0.2–1.5 | 0.1–0.8 |
| Average Cell Size, mm | 0.7 | 0.3 |
| Number of cells per 10 mm | 18–24 | >40 |
| Density, kg/m³ | 449 | 384 |
| Compressibility, kPa | 48–51 | 48 |
| Bashore Resiliency | 75 | 65 |

The mixture produced with the profoamer had smaller, more uniform cells than the mixture produced without the profoamer.

EXAMPLE 4

A first composition was prepared by mixing 15 g of the first composition of Example 1 with 10 g of the dimethylvinylsiloxy endblocked polydimethylsiloxane of Example 1.

A comparative example was prepared by mixing the above first composition with 5 g of the second composition of Example 1. The mixture was stirred until uniform then allowed to form a froth and cure at room temperature. Samples were removed from the foam and tested as in Example 1 with the results as shown in Table IV.

A foam falling under the claims of this invention was prepared by first mixing the amounts shown above for the first composition with 0.625 g of the profoamer of Example 1 to give an improved first composition. This improved first composition was mixed with the second composition as described above and the foam resulting was tested as above with the results as shown in Table IV. The mixture had a viscosity of about 50 Pa's at 25° C. This foam had a ratio of hydrogen atoms bonded to silicon to the sum of vinyl radicals and hydroxyl radicals of 1.98:1.

TABLE IV

|  | Comparative Foam | Improved Foam |
| --- | --- | --- |
| Cell Size Range, mm | 0.4–1.5 | 0.1–1.0 |
| Average Cell Size, mm | 0.4 | 0.2 |
| Number of cells per 10 mm | 14 | 30 |
| Density, kg/m$^3$ | 256 | 272 |
| Compressibility, kPa | 8.3 | 14 |
| Bashore Resiliency | 55 | 56 |

The mixture produced with the profoamer gave a foam having smaller cells on average with many more cells per unit volume.

EXAMPLE 5

A foamable composition was prepared which contained liquified blowing agent so that the foam could be prepared using aerosol containers.

A first composition was prepared by mixing together 27.8 g of a hydroxyl endblocked polydimethylsiloxane having a viscosity of about 5 Pa's at 25° C. and a hydroxy content of about 0.12 percent by weight, 21.6 g of a dimethylvinylsiloxy endblocked polydimethylsiloxane having a viscosity of about 0.5 Pa's at 25° C. and a vinyl content of about 0.49 percent by weight, and 0.47 g of a platinum containing catalyst having 0.42 weight percent platinum. The catalyst was prepared by reacting 55.5 parts of a dimethylvinylsiloxy endblocked polymethyl(3,3,3-trifluoropropyl)siloxane containing an average of three fluorinated siloxane units per molecule with 1 part of chloroplatinic acid hexahydrate following the procedure of U.S. Pat. No. 3,419,593, issued Dec. 31, 1968 to Willing, said patent being incorporated by reference to show the catalyst and its method of manufacture. This mixture also contained 1.4 g of a fluorinated profoamer prepared by adding 10 parts of a mixture of homologous fluoroalcohols of the general formula $F(CH_2)_nCH_2CH_2OH$ where the average value of n is 8 (commercially available as Zonyl ®BA fluoroalcohol from E. I. duPont deNemours Co.) to 90 parts of a resinous, benzene-soluble organosiloxane copolymer of the type described by Daudt and Tyler in U.S. Pat. No. 2,676,182 and containing $(CH_3)_3SiO_{\frac{1}{2}}$ units and $SiO_2$ units in a molar ratio of about 0.7:1 and about 3 percent by weight hydroxyl radicals present as a 50 percent by weight solution in xylene, followed by the addition of 1 part of a 1N ethanoic solution of potassium hydroxide. The resultant mixture was then heated at 120°–130° C. for about 2.5 hours, at which time it was allowed to cool. Solid carbon dioxide was then added to neutralize the acidic by-products present in the reaction mixture. The mixture was then combined with 100 parts of a trimethylsiloxy endblocked polydimethylsiloxane having a viscosity of about 0.01 Pa's at 25° C. The xylene and other volatile materials were removed by heating under reduced pressure. The profoamer contained $(CH_3)_3SiO_{\frac{1}{2}}$ and $SiO_{4/2}$ units, silicone bonded hydroxyl units and fluorinated siloxane units of the formula $F(CF_2)_8CH_2CH_2OSiO_{3/2}$. The molar ratio of all units in the profoamer with the exception of the hydroxyl groups and $SiO_{4/2}$ units to said $SiO_{4/2}$ units were from 0.7:1 to 1:1 inclusive and the surface tension of a 10 percent by weight solution of the profoamer in a hydroxyl endblocked polydimethylsiloxane exhibiting a viscosity of 0.01 Pa's at 25° C. was less than $2.2 \times 10^{-4}$ newton per cm at 25° C. and this solution required the addition of from 0 to 5 weight percent of o-xylene to achieve optical clarity. This mixture, having a viscosity less than 5 Pa's at 25° C., was placed into an aerosol container, a valve was applied, and 18 ml of isobutane was injected into the container through the valve. The container was then shaken to mix the isobutane throughout the mixture.

A second composition was prepared by mixing 26 g of the hydroxyl endblocked polydimethylsiloxane above, 21.6 g of the dimethylvinylsiloxy endblocked polydimethylsiloxane, 2.8 g of the hydrogen containing trimethylsiloxy endblocked polyorganosiloxane of Example 3, and 1.4 g of the above fluorinated profoamer. This mixture, having a viscosity less than 5 Pa's at 25° C., was placed into an aerosol container, a valve was applied, and 18 ml of isobutane was injected into the container through the valve. The container was then shaken to mix the isobutane throughout the mixture.

The valve of each aerosol container was then connected to a "T" joint which in turn was connected to a static mixer. On pressing the valves simultaneously, material from each can discharged into the T joint and travelled together through the static mixer where they were mixed. Upon exit from the static mixer, the material frothed as it exited. The froth gelled in about 2.5 minutes and cured in 6 minutes with a slightly tacky surface. A sample cut from the cured foam had a density of about 248 kg/m$^3$. The mixture had a ratio of hydrogen atoms bonded to silicon to the sum of vinyl radicals and hydroxyl radicals of 2.5:1.

EXAMPLE 6

A first composition was prepared identical to the improved first composition of Example 2 containing profoamer except 2.32 g of lauryl alcohol was also mixed into the composition.

A foam falling under the claims of this invention was then prepared by mixing 102.32 g of this first composition and 18 g of the second composition of Example 1 together for 30 to 60 seconds until uniform and then allowing the mixture to froth and cure at room temperature to form an open cell foam. The mixture before forming a froth was less than 75 Pa's at 25° C. Samples were removed and tested as in Example 1 with the results shown in Table V. Also shown are the results from a foam made from the improved composition of Example 2. The addition of the lauryl alcohol to the composition has produced a foam having a very low Bashore resiliency. Such a "dead" foam is useful in shock absorbing and sound absorbing applications.

TABLE V

|  | Improved Foam of Example 2 | Improved Foam of This Example |
| --- | --- | --- |
| Density, kg/m$^3$ | 285 | 262 |
| Bashore Resiliency | 25–55 | 0–6 |

EXAMPLE 7

A series of foams were prepared which contained both profoamer and lauryl alcohol as in Example 6, but using different mixing procedures. A first composition was prepared as in Example 1.

A second composition was prepared by mixing together 44 g of the hydroxy endblocked polydimethylsiloxane of Example 2, 14.7 g of the polymethylhydrogensiloxane of Example 2, 8.8 g of lauryl alcohol, and 32.4 g of the profoamer of Example 1.

A first foam was prepared by mixing 100 g of the above first composition with 35.3 g of the above second composition and allowing the mixture to froth and cure to a foam at room temperature.

A second foam was prepared by mixing 100 g of the above first composition and 44 g of the above second composition and allowing the mixture to froth and cure to a foam at room temperature.

A third foam was prepared by mixing 100 g of the above first composition and 53 g of the above second composition and allowing the mixture to froth and cure to a foam at room temperature.

A fourth foam was prepared by mixing together 100 g of the above first composition, 3.5 g of lauryl alcohol, and 22.5 g of the profoamer used above. After these ingredients were thoroughly mixed, 27 g of the second composition of Example 1 was admixed and the mixture was allowed to froth and cure to a foam at room temperature.

Samples of each foam were removed and tested for Bashore resiliency as in Example 1 with the result shown:

| Foam | Bashore Resiliency |
|---|---|
| 1 | 53 |
| 2 | 47 |
| 3 | 46 |
| 4 | 9 |

In order to obtain a foam having low Bashore resiliency, the lauryl alcohol and profoamer must be added to the first composition of vinyl-containing polydiorganosiloxane (1) and platinum catalyst (3) before the mixture of hydroxylated polydiorganosiloxane (2) and organohydrogensiloxane (4) is added.

EXAMPLE 8

Comparative compositions were prepared to illustrate the differences between foams prepared using a profoamer as in this invention and a fluorinated siloxane.

A first and second composition were prepared as in Example 1.

A control foam was prepared by mixing 100 g of the first composition and 18 g of the second composition together for from 30 to 60 seconds until uniformly mixed, and then allowing the mixture to froth and cure to a foam at room temperature. Samples were removed and tested as in Example 1, with the results shown in Table VI.

A foam falling under the claims of this invention was prepared by first mixing 100 g of the above first composition with 10 g of the profoamer of Example 1 to give an improved first composition. Foam was prepared by mixing 110 g of the improved first composition with 18 g of the second composition above and allowing to foam as in the control. The mixture had a viscosity of less than 50 Pa's and 25° C. The foam was tested as above with the results shown in Table VI.

A comparative foam was prepared by mixing 100 g of the above first composition with 10 g of trimethylsiloxy endblocked polytrifluoropropyl(methyl)siloxane fluid having a viscosity of 0.3 Pa's at 25° C. This comparative composition was then mixed with 18 g of the second composition above and allowed to foam as in the control. The comparative foam was tested as above with the results shown in Table VI.

A second comparative foam was prepared by mixing 100 g of the above first composition with 10 g of trimethylsiloxy endblocked polytrifluoropropyl(methyl)siloxane fluid having a viscosity of 1.0 Pa's at 25° C. This second comparative composition was then mixed with 18 g of the second composition above and allowed to foam as in the control. The second comparative foam was tested as above with the results shown in Table VI.

The profoamer had a different effect upon the foam than did the fluorinated siloxane fluid. The density of the foam went up, when compared to the control, when the fluorinated siloxane fluid was added; while the density went down when the profoamer was added. The compressibility went up or stayed the same when the fluorinated siloxane fluid was added, while the compressibility went down when the profoamer was added. The profoamer also gave more uniform cells in the foam.

TABLE VI

| | Control | Profoamer | Fluorinated Fluid 0.3 Pa·s | Fluorinated Fluid 1.0 Pa·s |
|---|---|---|---|---|
| Density, kg/m³ | 386 | 382 | 400 | 428 |
| Compressibility, kPa | 89 | 72 | 118 | 94 |
| Resiliency, Bashore | 68 | 58 | 62 | 60 |
| Cell Size Range, mm | 0.1–1.5 | 0.1–1.0 | 0.1–1.5 | 0.3–2.0 |
| Average Cell Size, mm | 0.4 | 0.4 | 0.2 | 0.2 |
| Number of cells per 10 mm | 23 | >30 | >30 | >30 |

EXAMPLE 9

Foams were prepared which contained additives to improve the flame resistance of the foams.

A composition 1A was prepared by mixing 52.4 parts of a hydroxyl endblocked polydimethylsiloxane fluid having a viscosity of about 0.08 Pa's at 25° C. and a hydroxyl content of about 1.7 weight percent, 47 parts of the dimethylvinylsiloxy endblocked polydimethylsiloxane of Example 1, 1.77 parts of the platinum catalyst of Example 1, 15.09 parts of the profoamer described below, 7.55 parts of normal-propanol, 25.15 parts of a mixture of 75 percent by weight of the dimethylvinylsiloxy endblocked polydimethylsiloxane of Example 1 and 25 percent by weight of a 60 percent by weight solution of the resin copolymer of Example 1 in xylene, the mixture being stripped of xylene before use, and 9 parts of staple ceramic fiber having an average diameter of about 2 to 3 micrometers, a mean length of about 40 millimeters with lengths up to 100 millimeters.

The profoamer was made by first mixing in a glass flask, 5 parts of the Zonyl ®BA fluoroalcohol of Example 5, 33 parts of xylene, and 0.25 part of 1 normal potassium hydroxide. This mixture was heated to reflux temperature, then 62 parts of a 72 percent by weight solids in xylene mixture of the resinous, benzene-soluble organosiloxane polymer of Example 5 was slowly added through an addition funnel. This mixture was refluxed for about 1 hour with a Dean-Stark water trap in the setup to remove the water formed by the condensation of the resin hydroxyl groups and the fluoroalcohol. The flask was then cooled and 1 part of an acid-treated clay was admixed to neutralize the potassium hydroxide. Then 50 parts of trimethylsiloxy endblocked polydimethylsiloxane having a viscosity of about 0.01 Pa's at 25° C. was admixed and the contents heated to strip off the xylene. The remaining fluid was then cooled and filtered to remove the clay and potassium salts. The filtrate was a 50 percent solution of profoamer in silicone fluid.

A composition 1B was prepared similar to composition 1A, but the amount of ceramic fiber was increased to 15 parts.

A composition 2 was prepared by mixing 52.4 parts of a hydroxyl endblocked polydimethylsiloxane fluid having a viscosity of about 48 Pa's at 25° C. and about 0.057 weight percent hydroxyl radical with 33 parts of the polymethylhydrogen siloxane of Example 1.

A series of foams were prepared by mixing together composition 1A or 1B with composition 2 in the amounts shown in Table VII. In foam 2, aluminum trihydrate filler was added as shown. In foams 3 and 5, carbon black was added as shown. In each case, the mixture was allowed to form a froth and cure at room temperature.

After 24 hours at room temperature, the foams were removed from the containers and tested for flammability. The samples were about 10 cm in diameter and about 3 to 5 cm thick. A propane hand-held torch was fitted with a spreading nozzle. Each sample was weighed, then, with the top surface during foaming held in a vertical position, exposed to the propane flame for 2 minutes with the tip of the visible flame at the surface of the sample. The flame was then removed and then sample allowed to burn or extinguish for an additional 5 minutes. The sample was then weighed and a weight loss calculated. Each sample was left for 24 hours and reweighed and the weight loss calculated with the results shown in Table VII. Those foams having both ceramic fiber and carbon black as ingredients had the lowest weight loss, extinguishing after the flame was removed. The samples having neither aluminum trihydrate or carbon black present tended to smolder and lose weight after the 7 minute period.

TABLE VII

| Foam | 1 | 2 | 3 | 4 | 5 |
|---|---|---|---|---|---|
| Comp. 1 A | 18.8 | 18.8 | 18.8 | — | — |
| Comp. 1 B | — | — | — | 19.8 | 19.8 |
| Aluminum Trihydrate | — | 3 | — | — | — |
| Carbon Black | — | — | 1.5 | — | 1.5 |
| Comp. 2 | 21 | 21 | 21 | 21 | 21 |
| Ceramic Fiber, % | 2.7 | 2.5 | 2.6 | 4.5 | 4.3 |
| Aluminum Trihydrate, % | — | 7.0 | — | — | — |
| Carbon Black, % | — | — | 3.6 | — | 3.6 |
| Total, % | 2.7 | 9.5 | 6.2 | 4.5 | 7.9 |
| Percent Weight Loss | | | | | |
| after 7 min. | 12.4 | 15.0 | 7.4 | 12.2 | 7.2 |
| after 24 hrs. | 22.3 | 18.2 | 7.7 | 22.8 | 7.6 |

EXAMPLE 10

Additional foams containing additives to improve flame resistance were prepared to compare the effects of combinations of additives.

A composition 1C was prepared similar to composition 1A of Example 9, but the amount of ceramic fiber was increased to 20 parts.

A composition 1D was prepared similar to composition 1A of Example 9, but using 5 parts of ceramic fiber.

A series of foams were prepared by mixing together composition 1B, 1C, or 1D with composition 2 in the amounts shown in Table VIII. In foam 6, the ceramic fiber was the only flame retardant present. In foam 7, carbon black was added so both ceramic fiber and carbon black were present. In foam 8, aluminum trihydrate was added, so both ceramic fiber and aluminum trihydrate were present. In each case, the mixture was allowed to form a froth and cure at room temperature.

After curing for 24 hours, the foams were removed from their containers and tested as in Example 9 with the results as shown in Table VIII.

A comparison of these results shows that both ceramic fiber and carbon black are necessary to obtain the best flame resistance. The amount of ceramic fiber added in foam 6 and the amount of aluminum trihydrate added in foam 8 is greater than the total amount of ceramic fiber and carbon black added in foam 7, but foam 7 had the lowest weight loss upon burning for the 7 minute period and showed no additional weight loss after that time.

TABLE VIII

| Foam | 6 | 7 | 8 |
|---|---|---|---|
| Comp. 1 B | — | — | 19.8 |
| Comp. 1 C | 20.8 | — | — |
| Comp. 1 D | — | 18.5 | — |
| Aluminum Trihydrate | — | — | 3.0 |
| Carbon Black | — | 1.5 | — |
| Comp. 2 | 21 | 21 | 21 |
| Ceramic Fiber, % | 6.0 | 1.5 | 4.2 |
| Aluminum Trihydrate, % | — | — | 6.8 |
| Carbon Black, % | — | 3.7 | — |
| Total, % | 6.0 | 5.2 | 11.0 |
| Percent Weight Loss | | | |
| after 7 min. | 14.7 | 6.7 | 13.0 |
| after 24 hrs. | 23.5 | 6.7 | 18.4 |

EXAMPLE 11

Flame retardant foams having a density of less than 160 kg/m$^3$ were prepared and tested.

A first composition was prepared by mixing 14.28 parts of a hydroxyl endblocked polydimethylsiloxane fluid having a viscosity of about 48 Pa's at 25° C. and about 0.057 weight percent hydroxyl radical, 5.7 part of a hydroxyl endblocked polydimethylsiloxane fluid having a viscosity of about 0.08 Pa's at 25° C. and a hydroxyl content of about 1.7 weight percent, 1.5 parts of a dimethylvinylsiloxy endblocked polydimethylsiloxane having a viscosity of about 30 Pa's at 25° C. and a vinyl content of about 0.08 weight percent, 2.72 parts of a mixture of 75 percent by weight of the above dimethylvinylsiloxy endblocked polydimethylsiloxane and 25 percent by weight of a 60 percent by weight solution of the resin copolymer of Example 1 in xylene, the mixture being stripped to remove the xylene before use, 2.25 parts of the profoamer of Example 1, 1.29 parts of normal propanol, 0.3 part of the platinum catalyst of Example 1, 0.85 part of the stable ceramic fiber of Example 9, and 1.20 parts of carbon black.

A foam was prepared by mixing together the above first composition with 6.15 parts of trimethylsiloxy endblocked polymethylhydrogensiloxane having a silicone-bonded hydrogen atom content of about 1.6 weight percent for from 30 to 60 seconds until uniformly mixed and then allowing the mixture to froth and cure to a foam at room temperature. After cure, samples was removed from the cured, mostly open-celled foam and physical properties and flame retardancy were measured as above. The results are shown in Table IX.

A second foam was prepared in the same manner as above, but the amount of ceramic fiber was increased to 1.53 parts. This foam was prepared and tested as above with the results shown in Table IX.

Both foams had a density well below 160 kg/m$^3$ and had good flame resistance in that they had a low weight loss when exposed to flame and had little additional weight loss when removed from the flame.

TABLE IX

| Foam | First | Second |
|---|---|---|
| Ceramic Fiber, % | 2.3 | 4.1 |
| Carbon Black, % | 3.3 | 3.3 |
| Density, kg/m$^3$ | 68.9 | 68.9 |
| Compressibility, kPa | | |
| 25% | 0.9 | 2.0 |
| 65% | 4.3 | 6.9 |
| Resiliency, Bashore | 3 | 18 |
| Percent Weight Loss | | |
| after 7 minutes | 5.94 | 3.73 |
| after 24 hours | 5.74 | 3.76 |

That which is claimed is:

1. A foamable silicone composition comprising a composition obtained by mixing
   (1) a vinyl containing polydiorganosiloxane having at least an average of about 2 vinyl radicals per molecule, the organic radicals being selected from the group consisting of alkyl radicals having from 1 to 6 carbon atoms per radical, phenyl, and vinyl,
   (2) a hydroxylated polydiorganosiloxane having an average of from greater than 1 to 2.5 silicon-bonded hydroxyl radicals per molecule and having an average of at least one organic radical per silicon atom selected from the group consisting of alkyl radicals having from 1 to 6 carbon atoms per radical and phenyl,
   (3) a platinum catalyst in an amount sufficient to give from 5 to 200 parts by weight platinum per one million parts by weight total mixture,
   (4) an organohydrogensiloxane having an average of at least 3 silicon-bonded hydrogen atoms per molecule, an average of no more than one silicon-bonded hydrogen atom per silicon atom and organic radicals selected from the group consisting of alkyl radicals having from 1 to 6 carbon atoms per radical and phenyl,
   (5) a profoamer consisting essentially of a resinous, benzene-soluble organosiloxane copolymer consisting essentially of SiO$_{4/2}$ units, silicon-bonded hydroxyl groups, (CH$_3$)$_3$SiO$_{1/2}$ units and fluorine-containing units selected from the group consisting of R$_a$R'$_b$SiO$_{(4-a-b)/2}$ and R"[Si(R')$_b$O$_{(3-b)/2}$]$_2$ and mixtures thereof, where R is a monovalent organic radical containing at least four perfluorinated carbon atoms and is bonded to the silicon atom of said fluorine-containing units by a sequence of at least two methylene units or by an oxygen atom that is, in turn, bonded to a sequence of at least two methylene units, R' is an alkyl radical containing from 1 to 3 carbon atoms, and R" is a divalent organic radical containing at least four perfluorinated carbon atoms and is bonded to the silicon atom of said fluorine-containing units by means of a carbon or oxygen atom, a is 1 or 2, b is 0, 1 or 2 and the sum of a and b is 3 or less with the provision that when R and R" represent fluorine-containing units bonded to silicon via an oxygen atom the organosiloxane copolymer optionally contains repeating units of the formula GSiO$_{3/2}$ where G represents the residue obtained by removal of the hydrogen atom from a hydroxyl group of a linear organic polymer containing an average of at least one terminal hydroxyl group per molecule and selected from the group consisting of polyethers, polyoxyalkylene glycols, homopolymers of ethylenically unsaturated alcohols and copolymers of ethylenically unsaturated alcohols with ethylenically unsaturated hydrocarbons; the molar ratio of all units other than hydroxyl and SiO$_{4/2}$ units to SiO$_{4/2}$ units is from 0.7:1 to 1.1:1, inclusive, and the concentration of said fluorine-containing units and any GSiO$_{3/2}$ units is sufficient to
   (a) impart a surface tension of less than $2.2 \times 10^{-4}$ newtons per centimeter at 25° C. to a 10 percent by weight solution of (5) in a hydroxyl endblocked polydimethylsiloxane exhibiting a viscosity of 0.08 Pa.s at 25° C., and
   (b) require the addition of from 0 to 100 percent by weight of xylene to said 10 percent by weight solution to achieve optical clarity and
   (6) optionally, an amount of liquified blowing agent sufficient to form a foam following the release of a mixture containing said liquified blowing agent into an area under atmospheric pressure, the mixture containing this liquified blowing agent being confined under superatmospheric pressure, and
   (7) optionally, an alcohol having from 1 to 12 carbon atoms, and
   (8) optionally, flame retardant additives consisting essentially of non-flammable fibers and sulfur-free carbon black,
there being sufficient organohydrogen present to provide a molar ratio of silicon-bonded hydrogen atoms to the sum of vinyl radicals, silicone-bonded hydroxyl radicals, and carbon bonded hydroxyl radicals of 0.5:1 to 40:1 the mixture having a viscosity of less than 100 Pa's at 25° C.

2. The composition of claim 1 in which the profoamer (5) is present in an amount of from 1 to 20 percent by weight of the composition.

3. The composition of claim 2 in which the fluorine-containing units of (5) are of the formula R$_a$R$_b$'SiO$_{(4-a-b)/2}$ where R is F(C$_n$F$_{2n}$)(CH$_2$)$_2$O$_c$; R' is methyl; a is 1; b is 0, 1, or 2; c is 0 or 1 and and wherein each of said fluorine-containing units n represents an integer that is the same or different with respect to the value of n in other fluorine-containing units of (5), the average value of n being from 4 to 20 inclusive.

4. The composition of claim 3 in which d is 0 and (5) is the reaction product of an organosiloxane copolymer consisting essentially of (CH$_3$)$_3$SiO$_{\frac{1}{2}}$ units, SiO$_{4/2}$ units and from 0.2 to about 4 percent by weight of silicon-bonded hydroxyl groups with a mixture of homologous silanes of the formula F(CF$_2$)$_n$CH$_2$CH$_2$Si(CH$_3$)$_b$Cl$_{3-b}$, where n varies amoung the silanes and represents an integer from 4 to 14 inclusive.

5. The composition of claim 3 in which d is 1 and (5) is the reaction product of an organosiloxane copolymer consisting essentially of (CH$_3$)$_3$SiO$_{\frac{1}{2}}$ units, SiO$_{4/2}$ units, and from 0.2 to about 4 percent by weight of silicon-bonded hydroxyl groups with a mixture of homologous fluorine-containing alcohols of the general formula F(CF$_2$)$_n$(CH$_2$)$_2$OH, wherein each molecule of said alcohols, n represents an even integer from 4 to 14 inclusive.

6. A silicone composition comprising a vinyl containing polydiorganosiloxane having at least an average of about 2 vinyl radicals per molecule, the organic radicals being selected from the group consisting of alkyl radicals having from 1 to 6 carbon atoms per radical, phenyl, and vinyl, and a profoamer consisting essentially of a resinous, benzene-soluble organosiloxane copolymer consisting essentially of $SiO_{4/2}$ units, silicon-bonded hydroxyl groups, $(CH_3)_3SiO_{4/2}$ units and fluorine-containing units selected from the group consisting of $R_aR'_bSiO_{(4-a-b)/2}$ and $R''[Si(R')_bO_{(3-b)/2}]_2$ and mixtures thereof, where R is a monovalent organic radical containing at least four perfluorinated carbon atoms and is bonded to the silicon atom of said fluorine-containing units by a sequence of at least two methylene units or by an oxygen atom that is, in turn, bonded to a sequence of at least two methylene units, R' is an alkyl radical containing from 1 to 3 carbon atoms, and R'' is a divalent organic radical containing at least four perfluorinated carbon atoms and is bonded to the silicon atom of said fluorine-containing units by means of a carbon or oxygen atom, a is 1 or 2, b is 0, 1 or 2 and the sum of a and b is 3 or less with the provision that when R and R'' represent fluorine-containing units bonded to silicon via an oxygen atom the organosiloxane copolymer optionally contains repeating units of the formula $GSiO_{3/2}$ where G represents the residue obtained by removal of the hydrogen atom from a hydroxyl group of a linear organic polymer containing an average of at least one terminal hydroxyl group per molecule and selected from the group consisting of polyethers, polyoxyalkylene glycols, homopolymers of ethylenically unsaturated alcohols and copolymers of ethylenically unsaturated alcohols with ethylenically unsaturated hydrocarbons; the molar ratio of all units other than hydroxyl and $SiO_{4/2}$ units to $SiO_{4/2}$ units is from 0.7:1 to 1.1:1, inclusive, and the concentration of said fluorine-containing units and any $GSiO_{3/2}$ units is sufficient to (a) impart a surface tension of less than $2.2 \times 10^{-4}$ newtons per centimeter at 25° C. to a 10 percent by weight solution of (5) in a hydroxyl endblocked polydimethylsiloxane exhibiting a viscosity of 0.08 Pa's at 25° C., and (b) require the addition of from 0 to 100 percent by weight of xylene to said 10 percent by weight solution to achieve optical clarity.

7. A silicone composition comprising a hydroxylated polydiorganosiloxane having an average of from greater than 1 to 2.5 silicon-bonded hydroxyl radicals per molecule and having an average of at least one organic radical per silicon atom selected from the group consisting of alkyl radicals having from 1 to 6 carbon atoms per radical and phenyl, and a profoamer consisting essentially of a resinous, benzene-soluble organosiloxane copolymer consisting essentially of $SiO_{4/2}$ units, silicon-bonded hydroxyl groups, $(CH_3)_3SiO_{\frac{1}{2}}$ units and fluorine-containing units selected from the group consisting of $R_aR'_bSiO_{(4-a-b)/2}$ and $R''[Si(R')_bO_{(3-b)/2}]_2$ and mixtures thereof, where R is a monovalent organic radical containing at least four perfluorinated carbon atoms and is bonded to the silicon atom of said fluorine-containing units by a sequence of at least two methylene units or by an oxygen atom that is, in turn, bonded to a sequence of at least two methylene units, R' is an alkyl radical containing from 1 to 3 carbon atoms, and R'' is a divalent organic radical containing at least four perfluorinated carbon atoms and is bonded to the silicon atom of said fluorine-containing units by means of a carbon or oxygen atom, a 1 or 2, b is 0, 1 or 2 and the sum of a and b is 3 or less with the provision that when R and R'' represent fluorine-containing units bonded to silicon via an oxygen atom the organosiloxane copolymer optionally contains repeating units of the formula $GSiO_{3/2}$ where G represents the residue obtained by removal of the hydrogen atom from a hydroxyl group of a linear organic polymer containing an average of at least one terminal hydroxyl group per molecule and selected from group consisting of polyethers, polyoxyalkylene glycols, homopolymers of ethylenically unsaturated alcohols and copolymers of ethylenically unsaturated alcohols with ethylenically unsaturated hydrocarbons; the molar ratio of all units other than hydroxyl and $SiO_{4/2}$ units to $SiO_{4/2}$ units is from 0.7:1 to 1.1:1, inclusive, and the concentration of said fluorine-containing units and any $GSiO_{3/2}$ units is sufficient to (a) impart a surface tension of less than $2.2 \times 10^{-4}$ newtons per centimeter at 25° C. to a 10 percent by weight solution of (5) in a hydroxyl endblocked polydimethylsiloxane exhibiting a viscosity of 0.08 Pa's at 25° C., and (b) require the addition of from 0 to 100 percent by weight of xylene to said 10 percent by weight solution to achieve optical clarity.

8. The silicone composition of claim 6 in which the composition is confined under superatomspheric pressure for storage and in which there is also an amount of liquified blowing agent sufficient to form a foam following the release of the composition containing said liquified blowing agent into an area under atmospheric pressure.

9. The silicone composition of claim 7 in which the composition is confined under superatomspheric pressure for storage and in which there is also an amount of liquified blowing agent sufficient to form a foam following the release of the composition containing said liquified blowing agent into an area under atmospheric pressure.

10. The composition of claim 2 in which from 1 to 10 percent by weight of (7) an alcohol having from 1 to 12 carbon atoms is also present.

11. The composition of claim 2 in which from 2 to 10 percent by weight of (8) flame retardant additives consisting essentially of non-flammable fibers and sulphur free carbon black are also present.

12. The foam produced by the composition of claim 1.

13. The elastomeric silicone foam produced by
(A) mixing ingredients consisting essentially of
   (1) a vinyl containing polydiorganosiloxane having at least an average of about 2 vinyl radicals per molecule, the organic radicals being selected from the group consisting of alkyl radicals having from 1 to 6 carbon atoms per radical, phenyl, and vinyl,
   (2) a hydroxylated polydiorganosiloxane having an average of from greater than 1 to 2.5 silicon-bonded hydroxyl radicals per molecule and having an average of at least one organic radical per silicon atom selected from the group consisting of alkyl radicals having from 1 to 6 carbon atoms per radical and phenyl,
   (3) a platinum catalyst in an amount sufficient to give from 5 to 20 parts by weight platinum per one million parts by weight total mixture,
   (4) an organohydrogensiloxane having an average or at least 3 silicon-bonded hydrogen atoms per molecule, an average of no more than one silicon-bonded hydrogen atom per silicon atom and organic radicals selected from the group consisting of alkyl radicals having from 1 to 6 carbon atoms per radical and phenyl, (5) a profoamer consisting essentially of a resinous, benzene-soluble organosiloxane copolymer consisting essentially of $SiO_{4/2}$ units, silicon-bonded hydroxyl groups, $(CH_3)_3SiO_{\frac{1}{2}}$ units and fluorine-containing units selected from the group consisting of $R_aR'_bSiO_{(4-a-b)/2}$ and $R''[Si(R')_bO_{(3-b)/2}]_2$ and mixtures thereof, where R is a monovalent organic radical containing at least four perfluorinated carbon atoms and is bonded to the silicon atom of said fluorine-containing units by a sequence of at least two methylene units or by an oxygen atom that is, in turn, bonded to a sequence of at least two methylene units, R' is an alkyl radical containing from 1 to 3 carbon atoms, and R'' is a divalent organic radical containing at least four perfluorinated carbon atoms and is bonded to the silicon atom of said fluorine-containing units by means of a carbon or oxygen atom, a is 1 or 2, b is 0, 1 or 2 and the sum of a and b is 3 or less with the provision that when R and R'' represent fluorine-containing units bonded to silicon via an oxygen atom the organosiloxane copolymer optionally contains repeating units of the formula $GSiO_{3/2}$ where G represents the residue obtained by removal of the hydrogen atom from a hydroxyl group of a linear organic polymer containing an average of at least one terminal hydroxyl group per molecule and selected from the group consisting of polyethers, polyoxyalkylene glycols, homopolymers of ethylenically unsaturated alcohols and copolymers of ethylenically unsaturated alcohols with ethylenically unsaturated hydrocarbons; the molar ratio of all units other than hydroxyl and $SiO_{4/2}$ units to $SiO_{4/2}$ units is from 0.7:1 to 1.1:1, inclusive, and the concentration of said fluorine-containing units and any $GSiO_{3/2}$ units is sufficient to (a) impart a surface tension of less than $2.2 \times 10^{-4}$ newtons per centimeter at 25° C. to a 10 percent by weight solution of (5) in a hydroxyl endblocked polydimethylsiloxane exhibiting a viscosity of 0.08 Pa's at 25° C., and (b) require the addition of from 0 to 100 percent by weight of xylene to said 10 percent by weight solution to achieve optical clarity and (6) optionally, an amount of liquified blowing agent sufficient to form a foam following the release of a mixture containing said liquified blowing agent into an area under atmospheric pressure, the mixture containing this liquified blowing agent being confined under superatmospheric pressure, and (7) optionally, an alcohol having from 1 to 12 carbon atoms, and (8) optionally, flame retardant additives consisting essentially of non-flammable fibers and sulfur-free carbon black, there being sufficient organohydrogen present to provide a molar ratio of silicon-bonded hydrogen atoms to the sum of vinyl radicals, silicone-bonded hydroxyl radicals, and carbon bonded hydroxy radicals of 0.5:1 to 40:1 the mixture having a viscosity of less than 100 Pa's at 25° C., thereafter, (B) allowing the mixture to form a froth and cure at ambient temperature to an elastomeric silicone foam.

* * * * *

UNITED STATES PATENT AND TRADEMARK OFFICE
CERTIFICATE OF CORRECTION

PATENT NO. : 4,608,396
DATED : August 26, 1986
INVENTOR(S) : Bauman, et al.

It is certified that error appears in the above-identified patent and that said Letters Patent is hereby corrected as shown below:

Col. 1, Line 10: "silicon elastomeric" should read "silicone elastomeric"

Col. 3, Line 5: "$R_aR'_bSiO_{(4-1-b)/2}$" should read "$R_aR'_bSiO_{(4-a-b)/2}$"

Col. 7, Line 43: "$(R)(CH)_3)_2SiOCH_3$" should read "$(R)(CH_3)_2SiOCH_3$"

Col. 10, Line 67: "such as resinous" should read "such a resinous"

Col. 15, Line 40: "$F(CH_2)_nCH_2CH_2OH$" should read "$F(CF_2)_nCH_2CH_2OH$"

Col. 23, Line 5, Claim 6: "$(CH_3)_3SiO_{4/2}$" should read "$(CH_3)_3SiO_{1/2}$"

Col. 23, Line 64, Claim 7: "a  1 or 2," should read "a is 1 or 2,"

Col. 24, Line 60, Claim 13: "5 to 20 parts" should read "5 to 200 parts"

Col. 26, Line 28, Claim 13: "hydroxy radicals" should read "hydroxyl radicals"

Signed and Sealed this

Twenty-fifth Day of August, 1987

*Attest:*

DONALD J. QUIGG

*Attesting Officer*    *Commissioner of Patents and Trademarks*